United States Patent Office 3,725,122
Patented Apr. 3, 1973

3,725,122
PRESSURE-SENSITIVE ADHESIVE COATED ARTICLES HAVING A POLYACRYLATE ADHESIVE COATING
Hans Reinhard, Limburgerhof, Alfred Mueller, Biblis, and Bernhard Dotbauer, Ludwigshafen, Germany, assignors to Badische Anilin- & Soda-Fabrik Aktiengesellschaft, Ludwigshafen am Rhine, Germany
No Drawing. Filed Mar. 3, 1970, Ser. No. 16,224
Claims priority, application Germany, Mar. 6, 1969, P 19 11 306.5
Int. Cl. C09j 7/02
U.S. Cl. 117—122 P
2 Claims

ABSTRACT OF THE DISCLOSURE

Pressure-sensitive adhesive coated articles having at least one adhesive coating comprising a copolymer of (a) from 55 to 90% by weight of acrylic and/or methacrylic esters of primary and/or secondary alkanols having 4 to 12 carbon atoms, of which at least 25% are derived from alkanols having 6 to 12 carbon atoms;

(b) from 10 to 40% by weight of acrylic and/or methacrylic esters of tertiary alkanols having 4 to 12 carbon atoms; and (c) from 3 to 12% by weight of polymerizable heterocyclic N-vinyl compounds and/or other olefinically unsaturated monomers containing reactive groups.

---

Pressure-sensitive adhesive coated articles, such as self-adhesive tapes and films such as are used for sealing package or for decorative purposes, self-adhesive floor coverings in the form of webs or non-woven fabrics based on thick polyvinyl chloride sheeting, needle-punched or otherwise interlocked or bonded non-woven fibrous webs containing natural or synthetic fibers, or webs having loops or a tufted pile, self-adhesive labels, etc., are being adopted on an ever wider scale by industry. Such articles are usually flat and have at least one self-adhesive coating which will adhere to a surface when the article is lightly pressed against said surface without appreciable pressure being necessary to improve the bond between the article and the surface, whereas the removal of such self-adhesive articles from the surfaces without damaging the self-adhesive article can be achieved only with difficulty.

The adhesive coatings used on the self-adhesive articles are generally only a few tenths of a millimeter thick and are usually applied in the form of aqueous dispersions, or of solutions, of polymeric resins which may contain natural or synthetic rubber lattices. Adhesive resins which are increasingly used for such adhesive coatings are copolymers of acrylic and methacrylic esters; of these, copolymers having high contents of polymerized units of acrylic and/or methacrylic acid esters of primary and/or secondary alkanols having 6 to 12 carbon atoms, methacrylonitrile and/or acrylonitrile and about 3 to 10% of acrylic acid, methacrylic acid, acrylamide and/or methacrylamide have proved to be particularly suitable. Such adhesive coatings are clear and transparent and show excellent cohesion and adhesion. However, the adhesive coatings suffer in many cases from the drawback of a yellow discoloration which appears and becomes increasingly marked during storage and use (yellowing).

We have now found that pressure-sensitive adhesive coated articles having at least one adhesive coating comprising an acrylic and/or methacrylic ester copolymer containing, as essential constituent, polymerized units of acrylic and/or methacrylic esters of alkanols having 6 to 12 carbon atoms have particularly valuable properties when the adhesive coating contains, as acrylic and/or methacrylic ester copolymers, a copolymer of (a) from 55 to 90% by weight of acrylic and/or methacrylic esters of primary and/or secondary alkanols having 4 to 12 carbon atoms, of which at least 25% are derived from alkanols having 6 to 12 carbon atoms, (b) from 10 to 40% by weight of acrylic and/or methacrylic esters of tertiary alkanols having 4 to 12 carbon atoms, and (c) from 3 to 12% by weight of polymerizable heterocyclic N-vinyl compounds and/or other olefinically unsaturated monomers containing reactive groups.

Examples of suitable acrylic and/or methacrylic esters, that is, esters of $\alpha,\beta$-olefinically unsaturated monocarboxylic acids having 3 or 4 carbon atoms, with primary and/or secondary alkanols having 4 to 12 carbon atoms, are those of n-butanol, s-butanol, n-hexanol, n-octanol, 2-ethylhexyl alcohol, n-decanol and n-dodecanol. The proportion of acrylic and/or methacrylic esters with primary and/or secondary alkanols having 6 to 12, and in particular 6 to 10, carbon atoms is generally in the range of 25 to 75% and preferably 30 to 60% of the amount of esters of the primary and/or secondary alkanols. We prefer to use the acrylic esters of n-butanol, n-hexanol, n-octanol, iso-octanol and 2-ethylhexyl alcohol. The proportion of acrylic and/or methacrylic esters of primary and/or secondary alkanols having 4 to 12 carbon atoms is preferably from 60 to 80% by weight of the copolymer.

The acrylic and/or methacrylic esters of tertiary alkanols having 4 to 12 carbon atoms may be derived, for example, from t-butanol, 2-ethylhexyl alcohol or 2-ethyldecyl alcohol. The proportion thereof in the copolymer preferably ranges from 20 to 35% by weight. Preferred tertiary esters are t-butyl acrylate and t-butyl methacrylate.

The acrylic and/or methacrylic ester copolymers preferably contain from 1 to 10% by weight, particularly from 2 to 8% by weight, of polymerized units of polymerizable heterocyclic N-vinyl compounds. Suitable N-vinyl compounds and N-vinyl caprolactam, N-vinyl imidazole and, preferably, N-vinyl pyrrolidone.

Preferably, the acrylic and/or methacrylic ester copolymers also contain from 0.5 to 7% by weight of polymerized units of other olefinically unsaturated monomers containing reactive groups. Examples of monomers of this kind are $\alpha,\beta$-olefinically unsaturated mono- and dicarboxylic acids and their amides, their N-alkylamides having 1 to 4 carbon atoms in the alkyl radical, and/or their N-methylolamides which may be etherified. Examples are acrylic acid, methacrylic acid, acrylamide, methacrylamide, N-methylacrylamide, N-methylol acrylamide, N-methylol methacrylamide, N-methoxy methacrylamide, N-n-butoxy methacrylamide, maleic acid, itaconic acid and fumaric acid and their amides, and crotonic acid and crotonic acid amide. The olefinically unsaturated carboxylic acids as defined above and their unsubstituted or substituted amides preferably contain from 3 to 5 carbon atoms. Other suitable olefinically unsaturated monomers containing reactive groups are monoesters of acrylic and methacrylic acids with alkanediols usually having 2 to 6 carbon atoms, such as glycol, 1,4-butanediol and 1,6-hexanediol or chlorohydroxyalkal esters of the said acids. Examples of comonomers containing hydroxyl groups as the reactive groups are, in particular, glycol monoacrylate, glycol monomethacrylate, butanediol - 1,4 - monoacrylate, 3-chloro - 2 - hydroxypropyl acrylate and 3-chloro-2-hydroxypropyl methacrylate. Other suitable comonomers containing reactive groups are vinylsulfonic acid, sodium vinylsulfonate and allyl alcohol. It is particularly advantageous to use copolymers containing polymerized units of N-vinyl compounds together with polymerized units of other monomers containing reactive groups as defined above, N-vinyl pyrrolidone, acrylic acid and methacrylic acid and their amides, which may be substituted by N-methylol groups, as well as 3-chloro-2-hydroxypropyl acrylate and 3-chloro - 2 - hydroxypropyl methacrylate being preferred. The proportion of monomers (c) is in the range of 3 to 12% by weight based on the weight of the copolymer.

The acrylic and/or methacrylic ester copolymers may be prepared in the usual manner by polymerizing the monomers, usually in solution in solvents such as acetone, ethyl acetate, toluene, methylethyl ketone, if desired in admixture with saturated hydrocarbons, or in aqueous dispersion using the usual emulsifying and dispersing agents such as are described, for example in "Methoden der organischen Chemie," by Houben-Weyl, vol XIV/1, part 1, pp. 190 to 202. The usual catalyst and, if desired, modifiers may be used.

In the manufacture of the pressure-sensitive adhesive coated articles, the acrylic and/or methacrylic ester copolymers are applied for example in the form of solutions, usually 15 to 30% solutions, in solvents of the kind mentioned above, or in the form of aqueous dispersions, usually 25 to 55% dispersions, to the surface of the substrate, for example film, tape, carpet back, polyvinyl chloride tiles or needle-punched web, in the usual manner. Known additives may be used in the usual quantities. For example, where particularly good resistance to ageing is not essential, solutions or aqueous dispersions of natural and/or synthetic rubber in proportions usually ranging from 10 to 25% by weight of the adhesive mixture or, alternatively, conventional natural or synthetic thickeners may be added.

Suitable substrates for the adhesive coatings are, for example, sodium paper, metal foils, particularly aluminum foil, films of polyethylene, polyvinyl chloride, polystyrene and polyesters such as polyethyleneglycolterephthalate, foamed materials of, for example, rubber, polyvinyl chloride, polystyrene, polyurethane and polyether, and woven and non-woven webs of fibrous material, such as woven textile fabrics and non-woven fabrics made from natural and/or synthetic fibers.

After the acrylic and/or methacrylic ester copolymers have been applied, for example by knife-coating using an aqueous dispersion to which a conventional synthetic thickener has been added, the coating is dried, generally at an elevated temperature, usually at temperatures between 70° and 150° C. The pressure-sensitive adhesive coating articles of the invention exhibit excellent surface tack, adhesiveness and thermal stability under load at, for example, 100° C. They are not inferior in these respects to prior art products, such as pressure-sensitive adhesive coated articles having an adhesive coating which contains a copolymer of from 90 to 94% by weight of 2-ethylhexyl acrylate, from 5 to 7% by weight of acrylonitrile and from 1 to 3% by weight of acrylic acid, with or without small quantities of other auxiliary monomers. However, the pressure-sensitive adhesive coated articles according to this invention are superior to the known products having the same surface tack, adhesiveness and thermal stability under load in that they are clear, transparent and colorless, that they show virtually no tendency to yellowing and that they have greater resistance to the action of plasticizers.

The invention is illustrated by the following examples, in which parts and percentages are by weight.

The values given in the examples for surface tack, adhesiveness, thermal stability under load and plasticizer resistance were determined as follows:

SURFACE TACK

Adhesive tapes approximately 25 cm. in length and 2 cm. in width are clamped in the upper jaws of a tensile-test machine so as to form a loop hanging vertically downwardly with its adhesive coating on the outside. The loop is then brought into contact with a horizontally fixed highly polished steel bar at the rate of 150 mm./minute and without the application of pressure. After the tape has been applied to the bar it is immediately pulled away from it at the same speed. The maximum force required to remove the loop from the bar is measured and recorded. The measurements are made in an air-conditioned chamber under constant conditions of temperature and humidity (20° C., 65% relative humidity) using adhesive tapes stored in the air-conditioned chamber for one dye prior to the test. The value given is the mean of ten results, a new tape being used for each test, and the steel bar being cleaned with gasoline before each test.

ADHESIVENESS

An adhesive tape approximately 25 cm. in length and 2 cm. in width is placed on a highly polished chromium-plated steel bar in such a way that no air bubbles are formed and is then rolled into close contact with the bar ten times by means of a rubber-coated steel roller weighing 1 kg. After storing for 25 hours in an air-conditioned chamber at 20° C. the adhesive tape is pulled from the bar at an angle of 180° C. and at a speed of 150 mm./minute. The test distance is 10 to 12 cm. of the adhering tape. The force required to remove the tape is measured. Each of the values given is the mean of ten test results.

THERMAL STABILITY UNDER LOAD

An adhesive tape 2 cm. in width is stuck to a chromium-plated, polished steel bar over an area of 5 cm.$^2$ in such a way that no air bubbles are formed. The assembly is heated in a drying cabinet at 100° C. and then heated at 100° C. in a temperature-controlled chamber containing a tensile-test machine, by means of which the tape is drawn off the steel bar at a speed of 25 mm./minute in such a way that the bond is subjected to shear. The values given are the means of 5 test results.

PLASTICIZER RESISTANCE

Pieces of film approximately 14 cm. in length, 6 cm. in width and 400$\mu$ in thickness and consisting of glass-clear polyvinyl chloride plasticized with about 25% of dioctyl phthalate are provided with a coating, 3 cm. in width, by means of a small knife-coater, the coating extending approximately centrally over the whole length of the piece of film. The rate of application of solid polymer is between 40 and 45 g./m.$^2$. After removal of the solvent or dispersing agent, a piece of unbleached sodium paper (gross weight 80 g./m.$^2$) cut to the same size is stuck to the coated film. This assembly is then stored suspended in a drying cabinet at 70° C. The penetration of the plasticizer through the adhesive coating is indicated by the formation of a "grease spot" on the sodium paper. The time it takes the plasticizer to strike through the adhesive layer in storage at elevated temperatures, for example at 70° C., is a measure of the plasticizer resistance of the bond. In testing each polymer three bonded assemblies are examined and storage is discontinued as soon as the first change in the sodium paper is noticed.

The adhesive tapes used in the following examples and comparative tests are made as follows:

Glass-clear films of polyethylene glycol terephthalate, about 40$\mu$ thick, are coated in the usual manner with an approximately 50% aqueous dispersion of the adhesive copolymer and the coatings are dried. In each case the adhesive copolymer is applied at the rate of from 24 to 26 g./m.$^2$. The resulting adhesive films are cut into adhesive tapes 2 or 5 cm. in width, and the tapes thus obtained are tested for surface tack, adhesiveness, thermal stability under load and plasticizer resistance of the adhesive polymer as described above. The copolymers used in the following Examples 1 to 10 and the comparative tests A and B are prepared from the following amounts of monomers. (The K values are determined in accordance with Fikentscher, Cellulosechemie, 13 (1932) 58.)

EXAMPLE 1

2-ethylhexyl acrylate 30.5%; n-butyl acrylate 30%; t-butyl acrylate 30%; N-vinyl pyrrolidone 4%; acrylic acid 5%; 3-chloro-2-hydroxypropyl acrylate 0.5%. K value: 69.

EXAMPLE 2

2-ethylhexyl acrylate 25%; n-butyl acrylate 30%; 2-ethylhexylacrylate-2 40%; acrylic acid 5%. K value: 83.

EXAMPLE 3 n-Octyl acrylate 30%; n-butyl acrylate 30%; t-butyl acrylate 30%; N-vinyl pyrrolidone 7%; methacrylic acid 2.5%; 3-chloro-2-hydroxypropyl acrylate 0.5%. K value: 71.

EXAMPLE 4

2-ethylhexyl acrylate 22%; n-butyl acrylate 30%; n-hexyl acrylate 32%; t-butyl acrylate 10%; acrylic acid 4%; N-methylol methacrylamide 1.5%. K value: 89.

EXAMPLE 5 n-Decyl acrylate 25%; 2-ethylhexyl acrylate 25%; t-butyl acrylate 40%; N-vinyl caprolactam 6%; butanediol monoacrylate 2.5%; acrylic acid 1.5%. K value: 67.

EXAMPLE 6 n-Octyl acrylate 42%; n-butyl acrylate 30%; 2-ethylhexylacrylate-2 20%; N-vinyl imidazole 4%; acrylic acid 3.5%; N-n-butoxymethyl methacrylamide 0.5%. K value: 102.

EXAMPLE 7 n-Decyl methacrylate 49%; n-butyl acrylate 30%; t-butyl methacrylate 10%; N-vinyl pyrrolidone 4%; itaconic acid 5%; methacrylamide 1%; N-methylol acrylamide 1%. K value: 85.

EXAMPLE 8 n-Nonyl methacrylate 50%; 2-methylbutylacrylate-1 15%; t-butyl acrylate 15%; N-vinyl imidazole 5%; sodium vinylsulfonate 4%; acrylic acid 1%. K value: 98.

EXAMPLE 9 n-Decyl methacrylate 53%; n-decyl acrylate 25%; t-butyl acrylate 10%; N-vinyl pyrrolidone 7%; sodium vinylsulfonate 2%; methacrylic acid 3%. K value: 83.

EXAMPLE 10 n-Undecyl acrylate 40%; n-hexyl methacrylate 40%; t-butyl acrylate 12%; ethyleneglycol monomethacrylate 8%. K value: 105.

COMPARATIVE TEST A 2-ethylhexyl acrylate 97%; acrylic acid 6%. K value: 59.

COMPARATIVE TEST B 2-ethylhexyl acrylate 94%; acrylic acid 6%. K value: 54.

The results of the tests in Examples 1 to 10 are given in the following Table 1 and those of the comparative tests A and B in the following Table 2.

TABLE 1

| Example | Surface tack (kg./2 cm.) | Adhesiveness (kg./2 cm.) | Thermal stability under load (kg./5 cm.²) | Plasticizer resistance (days approx.) |
|---|---|---|---|---|
| 1 | 0.8 | 1.1 | 5.1 | 3 |
| 2 | 0.9 | 1.1 | 4.7 | 3 |
| 3 | 0.5 | 0.8 | 4.8 | 3 |
| 4 | 1.0 | 1.1 | 4.4 | 2.5 |
| 5 | 0.8 | 0.6 | 5.8 | 2 |
| 6 | 0.7 | 0.6 | 2.9 | 2 |
| 7 | 0.7 | 0.9 | 3.9 | 3.5 |
| 8 | 1.2 | 0.8 | 4.2 | 3 |
| 9 | 0.8 | 0.7 | 4.2 | 3.5 |
| 10 | 0.9 | 1.0 | 5.6 | 2.5 |

TABLE 2

| Comparative test | Surface tack (kg./2 cm.) | Adhesiveness (kg./2 cm.) | Thermal stability under load (kg./5 cm.²) | Plasticizer resistance (days) |
|---|---|---|---|---|
| A | 0.3 | 0.3 | 3.3 | Less than 1. |
| B | 0.4 | 0.5 | 3.4 | Approx. 1. |

We claim:

1. Pressure-sensitive adhesive coated articles having at least one adhesive coating comprising a copolymer consisting essentially of
   (a) from 55 to 90% by weight of esters of α,β-olefinically unsaturated monocarboxylic acids having 3 or 4 carbon atoms with alkanols having 4 to 12 carbon atoms selected from the group consisting of primary and secondary alkanols, of which at least 25% are derived from alkanols having 6 to 12 carbon atoms,
   (b) from 10 to 40% by weight of esters of tertiary butyl alcohol with α,β-olefinically unsaturated monocarboxylic acids having 3 or 4 carbon atoms,
   (c) from 1 to 10% by weight of N-vinyl pyrrolidone and
   (d) from 0.5 to 7% by weight of monomers selected from the group consisting of acrylic acid, methacrylic acid, acrylamide, methacrylamide, N-methylol acrylamide, N-methylol methacrylamide, 3-chloro-2-hydroxypropyl acrylate and 3-chloro-2-hydroxypropyl methacrylate, the content of copolymerized units of monomers (c) and (d) together in the copolymer being from 3 to 12% by weight.

2. Pressure-sensitive adhesive coated articles having at least one adhesive coating comprising a copolymer consisting essentially of
   (a) from 55 to 90% by weight of esters of α,β-olefinically unsaturated monocarboxylic acids having 3 or 4 carbon atoms with alkanols having 4 to 12 carbon atoms selected from the group consisting of primary and secondary alkanols, of which at least 25% are derived from alkanols having 6 to 12 carbon atoms,
   (b) from 10 to 40% by weight of esters of tertiary alkanols having 4 to 12 carbon atoms with α,β-olefinically unsaturated monocarboxylic acids having 3 or 4 carbon atoms,
   (c) from 1 to 10 by weight of heterocyclic N-vinyl compounds selected from the group consisting of N-vinyl pyrrolidone, N-vinyl caprolactam and N-vinyl imidazole, and
   (d) from 0.5 to 7% by weight of olefinically unsaturated monomers containing reactive groups and selected from the group consisting of α,β-olefinically unsaturated mono- and di-carboxylic acids having 3 to 5 carbon atoms, their amides and their N-methylol amides, vinylsulfonic acid, sodium vinylsulfonate, allyl alcohol, monoesters of α,β-olefinically unsaturated monocarboxylic acids having 3 or 4 carbon atoms with alkanediols having 2 to 6 carbon atoms, 3-chloro-2-hydroxypropyl acrylate and 3-chloro-2-hydroxypropyl methacrylate, the content of copolymerized units of monomers (c) and (d) together in the copolymer being from 3 to 12% by weight.

References Cited
UNITED STATES PATENTS

| | | | |
|---|---|---|---|
| 3,299,010 | 1/1967 | Samour | 260—901 X |
| 3,400,103 | 9/1968 | Samour | 260—86.1 UX |
| 3,532,652 | 10/1970 | Zang et al. | 117—122 X |
| 3,100,760 | 8/1963 | Brown et al. | 260—86.1 X |

MURRAY KATZ, Primary Examiner

B. D. PIANALTO, Assistant Examiner

U.S. Cl. X.R.

117—122 PA, 122 PF, 161 K, 161 UC, 161 UN, 161 UT; 260—79.7, 80.72, 80.73, 80.75, 80.81, 86.1 E, 901